United States Patent [19]

Mottershead et al.

[11] 4,309,925
[45] Jan. 12, 1982

[54] TOOL COMPENSATION MECHANISM

[75] Inventors: Frank R. Mottershead, Birmingham; John J. Konkal, Bloomfield Hills; Charles G. Gerlach, Mt. Clemens, all of Mich.

[73] Assignee: The Cross Company, Fraser, Mich.

[21] Appl. No.: 93,836

[22] Filed: Nov. 13, 1979

[51] Int. Cl.³ .............................................. B23B 5/40
[52] U.S. Cl. ........................................ 82/12; 82/1.2
[58] Field of Search ............... 82/12, 1.5, 2 B, 1.2; 408/147, 156, 159, 180

[56] References Cited

U.S. PATENT DOCUMENTS

| | | | |
|---|---|---|---|
| 2,134,210 | 10/1938 | Secor | 408/180 |
| 2,540,520 | 2/1951 | Hoern | 82/1.2 |
| 3,914,678 | 10/1975 | Chynoweth et al. | 82/2 B |
| 4,224,846 | 9/1980 | Eysel et al. | 408/150 |

FOREIGN PATENT DOCUMENTS

| | | | |
|---|---|---|---|
| 13505 | of 1851 | United Kingdom | 82/12 |
| 432984 | 11/1974 | U.S.S.R. | 408/156 |

*Primary Examiner*—Leonidas Vlachos
*Attorney, Agent, or Firm*—Harness, Dickey & Pierce

[57] ABSTRACT

A boring bar for machining an internal spherical surface. The bar has a cutting element and a holder therefor both of which rotate bodily with the bar and are simultaneously pivotable in a cutting operation about an axis transverse to the rotational axis. At the same time, the portion of the holder carrying the cutting element can be adjusted radially to the transverse axis for precise positioning of the cutting element. Remotely operable actuator mechanisms are provided, one for pivoting the holder to make the cut and the other for making the radial adjustment to set the cutting element initially to the desired radius dimension and subsequently to compensate for wear, the latter mechanism being uniquely constructed and arranged to make the adjustment while the boring bar is still rotating so as not to affect the normal cycle time of the machine and to provide solid support for the cutting element in all adjusted positions thereof.

20 Claims, 6 Drawing Figures

TOOL COMPENSATION MECHANISM

BACKGROUND OF THE INVENTION

The boring machine of this invention is intended primarily for use in high production operations where it is necessary to machine an internal spherical surface in a workpiece to a relatively close tolerance dimension and to maintain this dimension within a small tolerance range throughout an extended production period. An automobile differential gear housing is an example of a workpiece having an internal spherical surface that can be formed by the tool of this invention.

In a typical machining operation for this type of workpiece, the latter are moved progressively through a work station of the machine, and as each workpiece enters the station it is suitably located and clamped in position for the boring operation. The boring bar is then advanced to bring the cutting element into position to make the cut, and the cutting element is swung in an arcuate path while revolving bodily about the rotational axis of the boring bar. Thereafter, the boring bar is retracted to clear the workpiece and the latter is removed while a new workpiece is being moved into the work station. This completes the operating cycle of the machine.

It is conventional practice to check the radius dimension of workpieces coming from the work station either manually or by suitable automatic means such as the apparatus disclosed in the Chynoweth U.S. Pat. No. 3,914,678 dated Oct. 21, 1975 and owned by the assignee of the present application. When the radius dimension approaches either the minimum or the maximum permissible tolerance limit, the cutting element is reset to a larger or smaller radius that will make the cut more nearly midway of the tolerance range specified. These radial adjustments are made periodically as required by tool wear or tool build-up usually in increments of one half thousandths inches when the machining is to a close tolerance dimension.

Heretofore, it has been the practice to adjust the cutting element at the end of an operating cycle. This can be done either manually or automatically by known means but all such means have required that the entire rotary drive for the boring bar be stopped before the adjustment can be made. The time spent in stopping rotation of the boring bar, in making the necessary adjustment, and in getting the drive back to operational speed represents lost production time. In practice, adjustments must be made sufficiently often so that they interrupt the normal cycle of the machine and result in a significant production loss.

The purpose of the present invention is to provide a machine of the type hereinabove described in which the cutting element can be adjusted precisely radially to a predetermined dimension, or to compensate for either tool wear or tool build-up, automatically while the boring bar is being rotatably driven, whereby there is no interruption or delay in the operating cycle of the machine and consequently no loss in production of parts produced by the machine as a result of making the adjustment.

SUMMARY OF THE INVENTION

According to the present invention, the portion of the holder that carries the cutting element, although normally rigidly supported, is adapted to be flexed radially with respect to the rotational axis of the boring bar in small but significant increments of adjustment either inwardly or outwardly to change the cutting radius of the tool. Usually the cutting element is moved radially outwardly by increments in the order of one half thousandths of an inch to compensate for wear and these adjustments are made periodically as required within the total permissible range of adjustment which usually will be somewhere in the neighborhood of five thousandths inches. Power actuated mechanism is provided for making the adjustment from a location remote from the cutting element and preferably from the rearward end of the spindle that carries and rotatably drives the boring bar while the spindle itself is being rotatably driven and without interfering or in any way affecting the operation of the mechanism that turns or swings the cutting element in its arcuate cutting stroke. The mechanism for adjusting the cutting element is uniquely constructed and arranged to fit in the exceedingly restricted environment afforded by the spindle and its appurtenances while at the same time accommodating the companion mechanism for rocking or oscillating the holder to make the cutting movement. In addition, the adjusting mechanism is uniquely designed to translate a relatively large movement of the power actuator into a very small movement of the cutting element. This translational movement is made through a series of mechanically related parts every one of which is so related to the part it actuates as to provide solid support therefor whereby to hold the cutting element solidly and securely in all adjusted positions thereof against the forces imposed on the cutting element during the cutting operation.

DESCRIPTION OF THE PREFERRED EMBODIMENT

Figure 1:
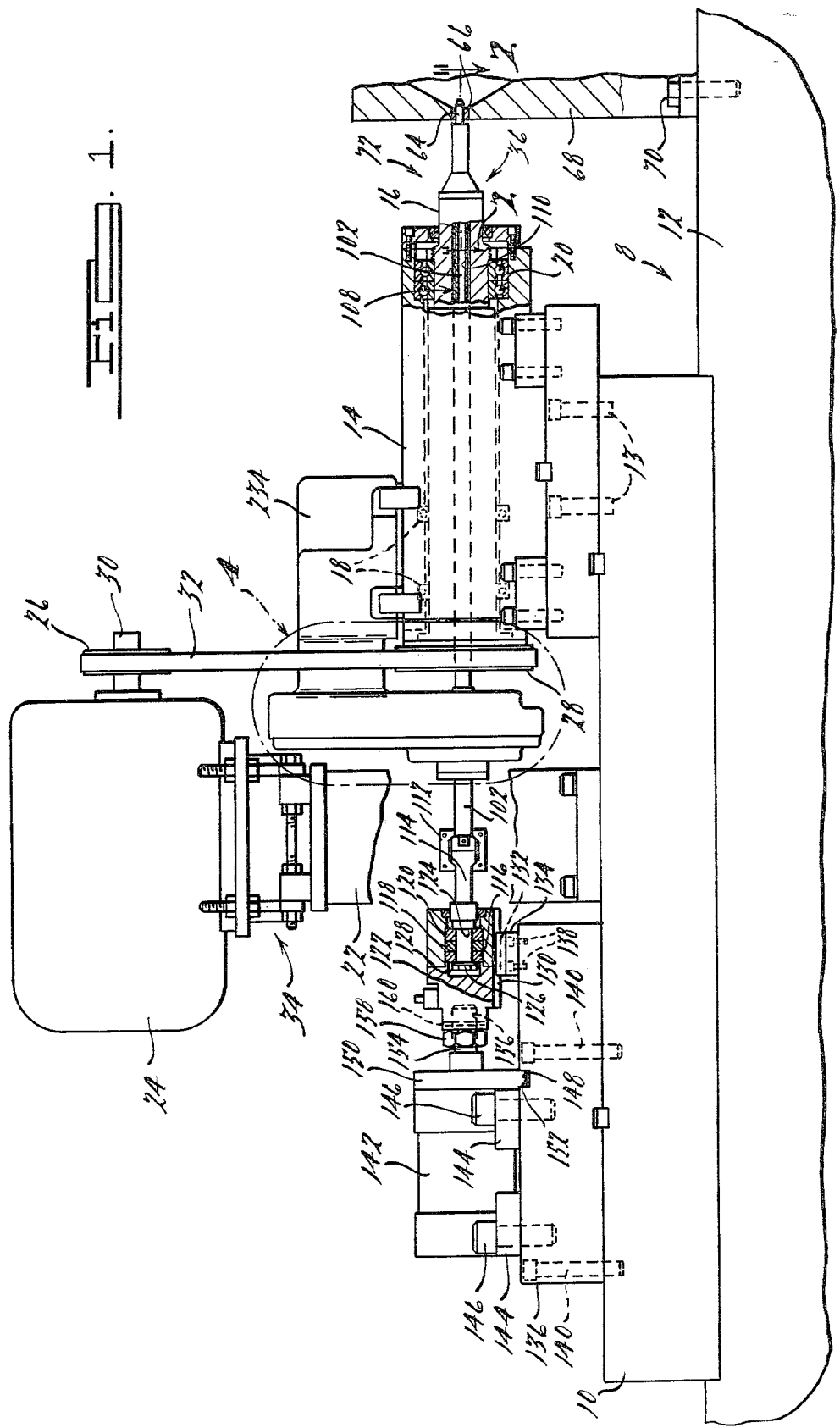
FIG. 1 is a side elevational view of a boring machine embodying the present invention.

In the drawing, wherein for the purpose of illustration is shown a preferred embodiment of the invention, the numeral 8 designates a machine tool of a known type having a slide 10 mounted on a base or column 12 for reciprocatory movement from right to left as viewed in FIG. 1. Any suitable or conventional means, such as a power cylinder (not shown), can be provided for reciprocally actuating the slide 10. Surmounting the right hand portion of the slide 10 and fastened securely thereto in any suitable or conventional manner as by screws 13 is a spindle housing 14 in which a spindle 16 is mounted for rotation on bearings 18 and 20. Also mounted on the slide 10 behind and spaced from the spindle housing 14 is a vertical support 22, and surmounting the support is a motor 24 that rotatably drives the spindle 16 through drive and driven pulleys 26 and 28 on the motor drive shaft 30 and spindle respectively, and an endless belt 32. Suitable adjustment means 34 is provided for shifting the drive motor 24 on the support 22 to and from the driven pulley 28 to selectively tension the drive belt 32.

Figure 2:
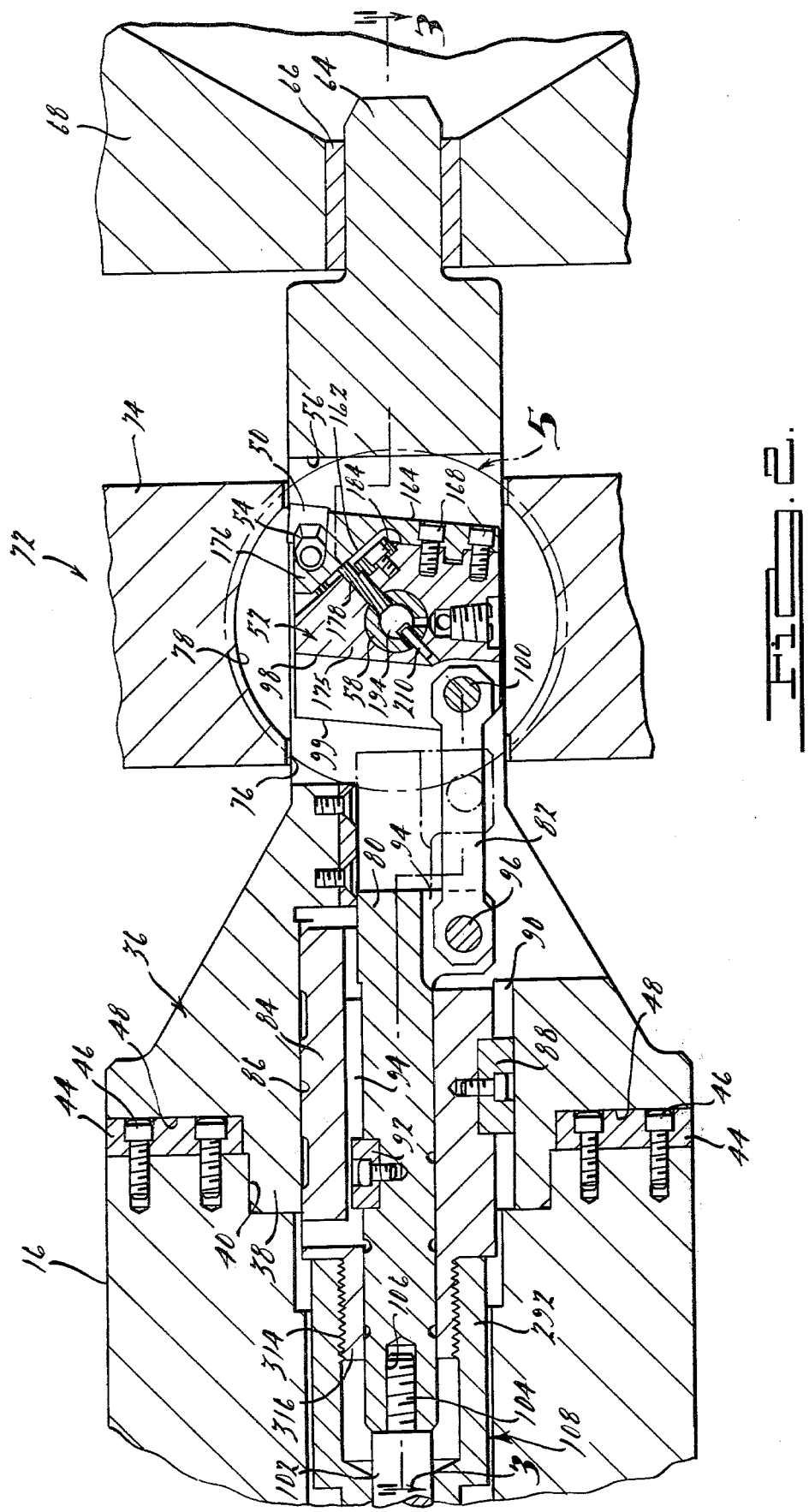
FIG. 2 is an enlarged, fragmentary, longitudinal sectional view taken on the line 2—2 of FIG. 1.
Figure 5:
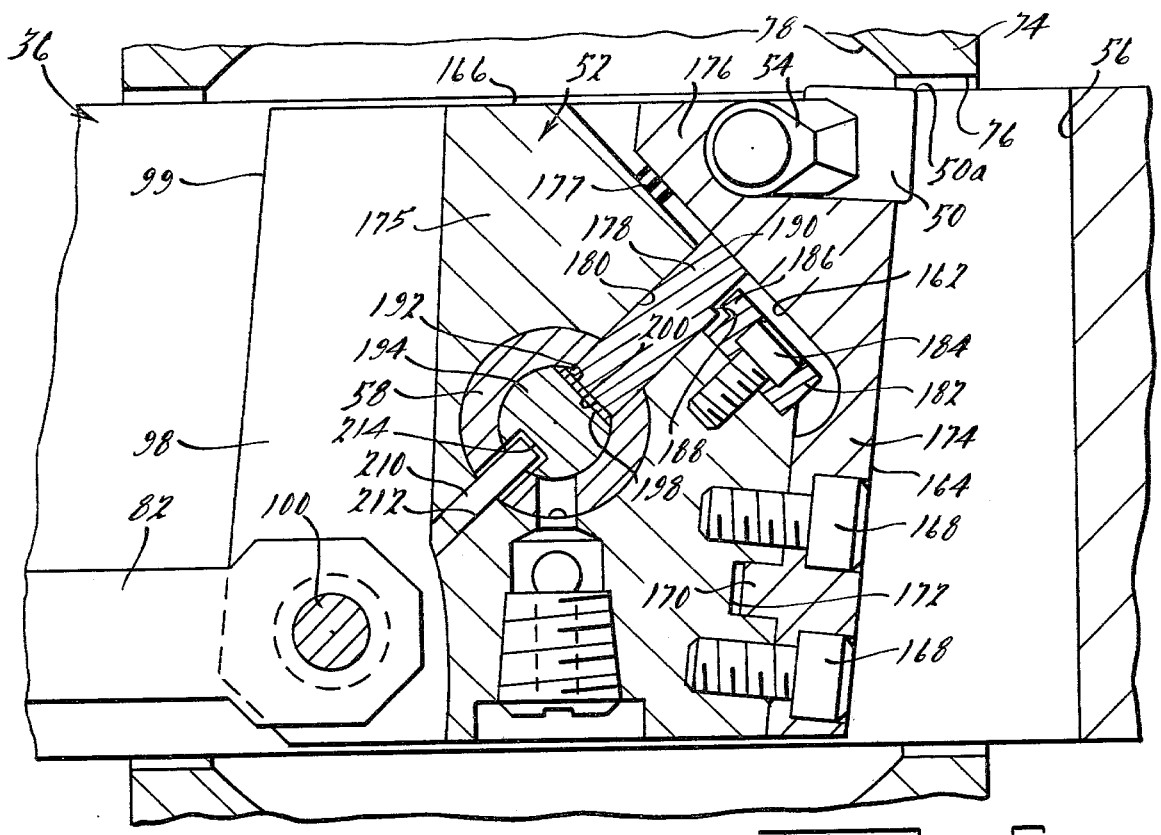
FIG. 5 is an enlarged view of the portion of FIG. 2 enclosed in the circle 5.

A boring bar 36 is piloted on the forward end of the spindle 16 by a central embossment 38 that extends into and is snugly received by a central recess 40 in the spindle. An annular series of bolts 42 fasten the boring bar 36 securely but detachably to the spindle, and radial keys 44 fastened to the end of the spindle 16 by screws 46 and snugly recieved in keyways 48 in the confronting face of the boring bar 36 establish a positive driving connection between the spindle and the boring bar. A cutting element 50 is detachably secured to a tool holding plate 52 by a tool plate clamp 54. The tool holding plate 52 is disposed in a diametrical through slot 56 provided in the middle portion of the boring bar 36 and press fitted on a sleeve bearing 58 that extends transversely through the slot with the terminal end portions thereof journaled for rotation in aligned openings 60 and 62 provided in the boring bar at opposite sides of the slot. When the tool holding plate 52 is positioned as shown in FIGS. 2 and 5, it and the cutting element 50 are contained entirely within the slot 56; but when the plate 52 is turned counterclockwise on the bearing 58, the cutting edge of the element 50 at the corner 50a thereof moves outside the boring bar 36 in an arcuate path about the center or axis of the bearing. At the extreme forward end of the boring bar 36 is a portion 64 of reduced diameter that enters and is snugly journaled by a bushing 66 in a stationary fixture 68 that is mounted on the base or column 12 and fastened thereto by screws 70 and adjustable fitting keys (not shown) opposite the slide 10 and a work station designated generally by the numeral 72.

In practice, a workpiece designated generally by the numeral 74 and shown more or less diagrammatically in the drawing, is adapted to be mounted in the work station 72 and located and clamped by any suitable or conventional means in position to receive the boring bar 36 when the latter is advanced into and through the work station by the slide 10. For the purpose of the present invention, the workpiece 74 may be any part having a through opening 76 through which the boring bar 36 passes when it is advanced by the slide 10 to insert the terminal pilot portion 64 thereof into the bearing 66 and an internal spherical surface 78 within the opening that is to be machined by the cutting element 50. As previously suggested, an automobile differential housing is a typical example of a workpiece on which the apparatus of this invention is intended to operate.

At the beginning of the operating cycle of the machine, the slide 10 is in its retracted position to the left from the position shown in FIG. 1 and the boring bar 36 also is in retracted position to clear the work station 72 and the workpiece 74. In the retracted position of the slide 10, the boring bar 36 is withdrawn completely from the fixture 68 and the workpiece 74, and this leaves the work station 72 open for removal of a finished workpiece from the station 72 and to receive a workpiece to be machined. It is contemplated that workpieces be moved into and out of the work station 72 simultaneously manually or automatically in any suitable or conventional manner.

To start the operating cycle after a new workpiece has been moved into the station 72 and suitably located and clamped, the boring bar 36 is advanced by the slide 10 or moved to the right as viewed in FIG. 1; and, as the boring bar approaches the fully advanced position, the terminal portion 64 thereof enters the bushing 66 which provides outboard support for the boring bar during the machining operation. In practice, the slide 10 comes up against a fixed stop (not shown) in its extreme forward position and is held solidly against the stop during machining of the workpiece 74. The machining operation itself is performed by turning the tool holding plate 52 counterclockwise as viewed in FIG. 2 while the boring bar 36 is being rotatably driven by the motor 24. Manifestly, the cutting element 50 is caused to revolve about the rotational axis of the boring bar 36 and, as it turns counterclockwise on the transversely disposed bearing 58, the cutting edge 50a of the element 50 generates the spherical surface 78. After the machining operation is complete, the tool holder 52 and the cutting element 50 are again disposed entirely within the boring bar slot 56 and the boring bar is moved by the slide 10 to the left as viewed in FIG. 1 to retract the bar from the workpiece and clear the work station 72 and the workpiece 74 preparatory to movement of the finished workpiece out of the station and movement of a new workpiece to be machined into the station. After the boring bar has retracted sufficiently to clear the workpiece 74, the tool holder 52 is returned clockwise to its initial position. This completes the operating cycle of the machine.

The mechanism for turning or oscillating the tool holder 52 on the bearing 58 is conventional and includes a front pull rod section 80 that is slidably supported in the boring bar 36 and connected at the forward end thereof to a corner of the tool holder 52 by a link 82. As shown in FIG. 2, the pull rod section 80 is disposed coaxially with respect to the boring bar 36 and concentrically within the sleeve 84 that fits snugly but slidably in an axial bore 86 extending rearwardly in the bar 36 from the through slot 56. The purpose of the sleeve 84 will be hereinafter described in detail. It is sufficient for the moment to say that the sleeve 84 is mounted for reciprocatory movement in the bore 86 and for mutual rotation with the boring bar 36 by a key 88 in the sleeve and a keyway 90 in the bore 86. The front pull rod section 80 in turn is independently reciprocable in the sleeve 84 but rotatably connected thereto by a key 92 and a keyway 94 in the rod and sleeve, respectively. It will be observed that the rearward end of the link 82 extends into a radial slot 94 in the front pull rod section 80 and is fastened to the latter by a pivot 96. The forward end of the link 82 extends into a slot 98 which extends entirely across the edge 99 of the tool holding plate 52 and is fastened to the plate by a pivot 100. The slot 98 is sufficiently deep to entirely accommodate the link 82 so as to permit the plate 52 to turn at least a full 90° in a counterclockwise direction from the position shown in FIG. 2. In one embodiment of the invention a 96° turn of the plate 52 was found to be most expedient. Both the pull rod section 80 and the sleeve 84 of course must be rotatably positioned in the boring bar 36 to assure longitudinal alignment of the link pivots 96 and 100 and restricted reciprocatory movement of the pull rod section 80 to turn the tool holding plate 52 on the bearing 58 through the link 82 to move the cutting element 50 on its cutting stroke.

At the beginning of a cutting stroke, the element 50 and the holder 52 are positioned as shown in FIGS. 2 and 5. At this time, the boring bar 36 and the cutting element 50 are being rotatably driven as previously described so that the cutting tip 50a of the element 50 is merely traveling in a circular path about the rotational axis of the spindle 16 and boring bar 36. However, when the rod section 80 is moved to the right, as viewed in FIG. 2, its acts through the link 82 to turn the tool holder plate 52 counterclockwise on the bearing 58 to swing the tip 50a of the cutting element 50 along the spherical surface 78 of the workpiece 74. In practice, the rod section 80 moves from the full line to the phantom line position shown in FIG. 2, and, as it advances, the link 82 is accommodated entirely within the transverse slot 98 of the tool holder plate 52. It is contemplated that the stoke of the rod section 80 be sufficiently long in every instance to turn the holding plate 52 sufficiently so that the plate and the cutting element 50 are fully contained in the boring bar slot 56 both in the initial position shown in FIG. 2 and at the end of the cutting stroke whereby the boring bar can be advanced through and retracted from the opening 76 in the workpiece 74 without interference from the boring bar or any of its parts.

The front pull rod section 80 in the boring bar 36 is fastened at the rearward end thereof to an intermediate pull rod section 102 by a threaded stud 104 that extends forwardly from the rod section 102 into an internally threaded hole 106 provided centrally in the rearward end of the front rod section 80. As shown in FIG. 1, the intermediate rod section 102 extends axially through and concentrically with respect to the spindle 16 and is slidably supported therein by a surrounding sleeve 108 which is disposed within a bore 110 extending axially through the spindle. As shown in FIG. 1, the intermediate rod section 102 projects rearwardly from the spindle 16 and is attached by a suitable coupling 112 to a short rear rod section 114 which in turn is rotatably supported by a bearing pack consisting of three bearings 116, 118 and 120 mounted in a casing 122.

Manifestly, the intermediate and rear pull rod sections 102 and 114 are required both to rotate and to reciprocate with the front pull rod section 80 since the intermediate section is fastened to the front pull rod section 80 by the connecting stud 104 and the rear section 114 is connected to the rod section 102 by the coupling 112. To this end, the bearings 116, 118 and 120 permit the associated rod section 114 to rotate but the bearings are confined between a radial shoulder 124 on the rod section 114 and a washer 126 which is held snugly against the rear bearing 116 by a nut 128 threaded on the rearwardly end of the rod.

In order to accommodate reciprocal movement of the rod section 114, the casing 122 is formed with a depending spline 130 which is slidably received in a longitudinal way 132 provided in a support 134 on a mounting block 136 surmounting the rearward end of the slide 10. The support 134 is detachably fastened to the mounting block 136 by screws 138, and the mounting block 136 is fastened to the slide 10 by screws 140.

Power to reciprocate the interconnected pull rod sections 80, 102 and 114 is provided by a hydraulic cylinder 142 on the mounting block 136. As perhaps best shown in FIG. 1, the cylinder 142 is provided with laterally extending mounting lugs 144 which are fastened securely to the mounting block 136 by screws 146. A depending flange 148 on the front end plate 150 of the cylinder 142 projects into and snugly fits a transverse slot 152 in the mounting block 136 to sustain the fore and aft thrust imposed in use on the cylinder by the piston rod 154 which extends into a threaded hole 156 in the casing 122. Hydraulic liquid is supplied to opposite ends of the cylinder 142 from any suitable source, and it is contemplated that this liquid be directed to one end or the other of the cylinder by a control valve (not shown) according to conventional practice.

In operation, a piston (not shown) on and movable with the piston rod 154 is adapted to move back and forth within limits defined by the cylinder 142. As the piston moves forwardly in the cylinder 142, its acts through the casing 122, the pull rod sections 80, 102 and 114, and the link 82 to turn the cutting tool holding plate 52 counterclockwise on the sleeve bearing 58. The cutting element 50 moves with the plate 52 and the cutting edge thereof traverses the internal spherical surface 78 of the workpiece 74. Conversely, when the piston is retracted in the cylinder, it acts through the same elements to turn the plate 52 clockwise on the sleeve bearing 58 to return the cutting element 50 to its initial position. The threaded end of the piston rod 154 permits axial adjustment of the rod in the hole 156 and consequently the position of the cutting element 50 at the ends of its clockwise and counterclockwise movements, and a lock nut 158 on the piston rod 154 is tightened against the casing 122 to hold the rod in a selected adjusted position. Preferably, a hole 160 is drilled diametrically through the casing 122 at the hole 156 and through the piston rod 154 in its final adjusted position, and a pin or cotter key is inserted into the hole 160 to positively prevent the piston rod from turning in the hole 160 after the parts have been properly adjusted.

Some change in the radial dimension of the cutting point 50a with respect to the rotational axis of the boring bar 36 occurs with successive cutting operations either inwardly due to wear of the cutting tool or outwardly due to build-up on the cutting edge. As this occurs, the surface 78 of successive workpieces 74 becomes progressively smaller or larger in diameter. The change in dimension usually occurs slowly, but it sometimes happens relatively quickly particularly in the case of workpieces where the dimension of the surface 78 must be held within close tolerances. Sometimes, too, the change in dimension becomes significant before sharpening or replacement of the cutting element 50 is necessary and the latter must be adjusted in order to prevent the machined surface from getting too close to or exceeding one or the other of the permissible tolerance dimensions.

Heretofore, it has been the practice in the case of multi-station machines where workpieces are moved progressively from one station to another for successive machining operations, to check the dimension particularly of those machined surfaces that must be held to a close tolerance at some point downstream from the station where the surface is machined and to adjust the cutting tool when the dimension of the surface being checked begins to approach the permissible tolerance limit. For example, when this condition is found to exist due to tool wear, the cutting element is adjusted outwardly to bring the surface of the workpiece being machined back more nearly into the middle of the tolerance range.

A system of the above type for maintaining a tolerance check on cylindrical machined surfaces formed by conventional boring operations and for making automatic adjustments of the cutting element is disclosed in U.S. Pat. No. 3,914,678 which issued Aug. 21, 1975 to the assignee of the present application. However, the mechanism for adjusting the cutting element disclosed in the above patent cannot be used for automatic adjustment where an internal spherical boring operation of the type herein disclosed is involved. In this special situation where the internal machined surface is of spherical configuration, the workpiece can be checked automatically for size, but it has been necessary heretofore to make the adjustment in the cutting element by hand periodically as the need for adjustment was indicated by the checking station monitoring the workpieces. In order to make the required adjustment, it has been necessary first to stop rotation of the boring bar at the end of the machine cycle, then to adjust the cutting element manually, and finally to check it for size. These operations take considerable time since the cutting element sometimes is not readily accessible and the adjustment may be small, perhaps in the order of five ten thousandths of an inch. Manifestly, considerable time is required not only to make the adjustment but to check the accuracy of the adjustment to this exceedingly small dimension. In the meantime, if the boring operation is being performed in a machine tool such as a transfer machine, for example, every station in the machine is shut down while the adjustment is being made and checked, and the production of the entire machine is stopped. A loss in production from a machine of this type is significant and it may be particularly important in those not infrequent situations where workpieces from the machine are carried to and thus affect the operation of other machines or have some critical relation to other manufacturing operations in the plant.

The present invention provides means for adjusting the cutting element 50 radially with respect to the rotational axis of the boring bar 36 automatically while the latter is being rotatably driven and without interrupting the cycle of the machine of which the boring bar is a part. An adjustment of any predetermined, desired amount can be made automatically at the end of any machining operation without shutting down the machine, and the adjustment means of this invention permits the cutting element to be adjusted not only radially outwardly but also radially inwardly as required. Furthermore, the adjustment means of this invention is uniquely constructed and arranged to provide solid support for the cutting element in all adjusted positions thereof.

According to the present invention, the cutting tool holding plate 52 is formed adjacent to the corner thereof that carries the cutting element 50 with an angularly disposed slot 162 that permits the portion of the plate that carries the cutting element to flex radially relative to the turning axis of the plate. As perhaps best shown in FIG. 2, the slot 162 is disposed a short distance behind the corner of the plate 52 that carries the cutting element 50, and it extends from a point near the edge 164 to and through the adjacent edge 166 and substantially at right angles to a radius extending from the turning axis of the plate 52 through the corner thereof that carries the cutting element 50.

For convenience in manufacturing and assembly, the portion 176 of the plate 52 that carries the cutting element 50 is made separate from the main body 175 of the plate. In the construction of the plate 52 shown in the drawing, both the portion 176 and the portion extending along the side 164 are formed in one piece and separately from the rest of the plate which is designated by the numeral 175, and these two portions of the plate are interconnected by screws 168 and an interfitting key and keyway 170 and 172. Manifestly, the neck section 174 at the closed end of the slot 162 forms a flexible hinge that permits flexure of the portion 176 and therefore adjustment of the cutting element 50 to and from the turning center of the plate 52.

Manifestly, movement of the portion 176 by flexure of the neck section 174 in the manner described, moves the cutting point 50a of the element 50 not only to or from the turning center of the plate 52 but also relative to the rotational axis of the boring bar 36, and it therefore changes the radius dimension of the machined surface 78. Preferably, in its initial position, the plate portion 176 is flexed radially outwardly from its normal or relaxed condition so that the inherent resiliency of the flexible section 174 will move the portion 176 inwardly pressure against it is relieved. Contrariwise, pressure against the portion 176 is increased to flex it radially outwardly still farther to increase the cutting radius of the element 50. Mounted in the outer or open end of the slot 162 is a suitable seal 177 which keeps chips, metal dust, and the like, created by the machining operation from entering and packing in the slot 162 and possibly interfering with flexing movement of the plate portion 176.

According to the present invention, the mechanism for moving the cutting element supporting portion 176 either inwardly or outwardly while at the same time accommodating the mechanism for turning the plate 52 back and forth on the sleeve bearing 58 while the boring bar 36 is being rotatably driven, comprises a pin-shaped actuator element 178 slidably mounted in a bore 180 provided in the main body portion 175 of the plate 52 behind the cutter carrying portion 176. As shown in FIGS. 2 and 5, the pin 178 is disposed substantially midway of the cutter carrying portion 176 and it extends substantially at right angles thereto so that outward movement of the pin in the bore 180 flexes the portion 176 to increase the cutting radius of the element 50 and movement of the pin 178 inwardly in the bore 180 releases pressure against the cutter carrying portion 176 and reduces the cutting radius of the element 50. A set screw 179 in the flexible plate portion 176 behind the cutting element 50 is tightened against the pin 178 to hold the neck portion 174 sufficiently tensioned to accommodate such retractive movement of the pin as occurs in the normal operation and use of the equipment. A stop 182 in the slot 162 at the inner end thereof and fastened to the main body portion 175 of the plate 52 by a screw 184 has a projecting finger 186 that overlays a shoulder 188 on the pin 178 to limit outward movement of the latter and consequential overstressing of the flexible and resilient hinge portion 174. The outer end 190 of the pin 178 that contacts the flexible plate portion 176 seats flatly thereagainst.

The bore 180 extends radially inwardly through the sleeve bearing 58 and opens onto a longitudinally tapered cam surface 192 provided on a cylindrical slide or plunger 194 that is mounted for reciprocable movement in the sleeve bearing. Reciprocatory movement of the plunger 194 is translated into sliding movement of the pin 178 to or from the pin carrying plate portion 176 depending upon the direction of movement of the plunger. The tapered cam surface 192 preferably is faced with a hardened wear plate 198, and the inner end 200 of the pin 178 seats on the wear plate 198.

Figure 3:
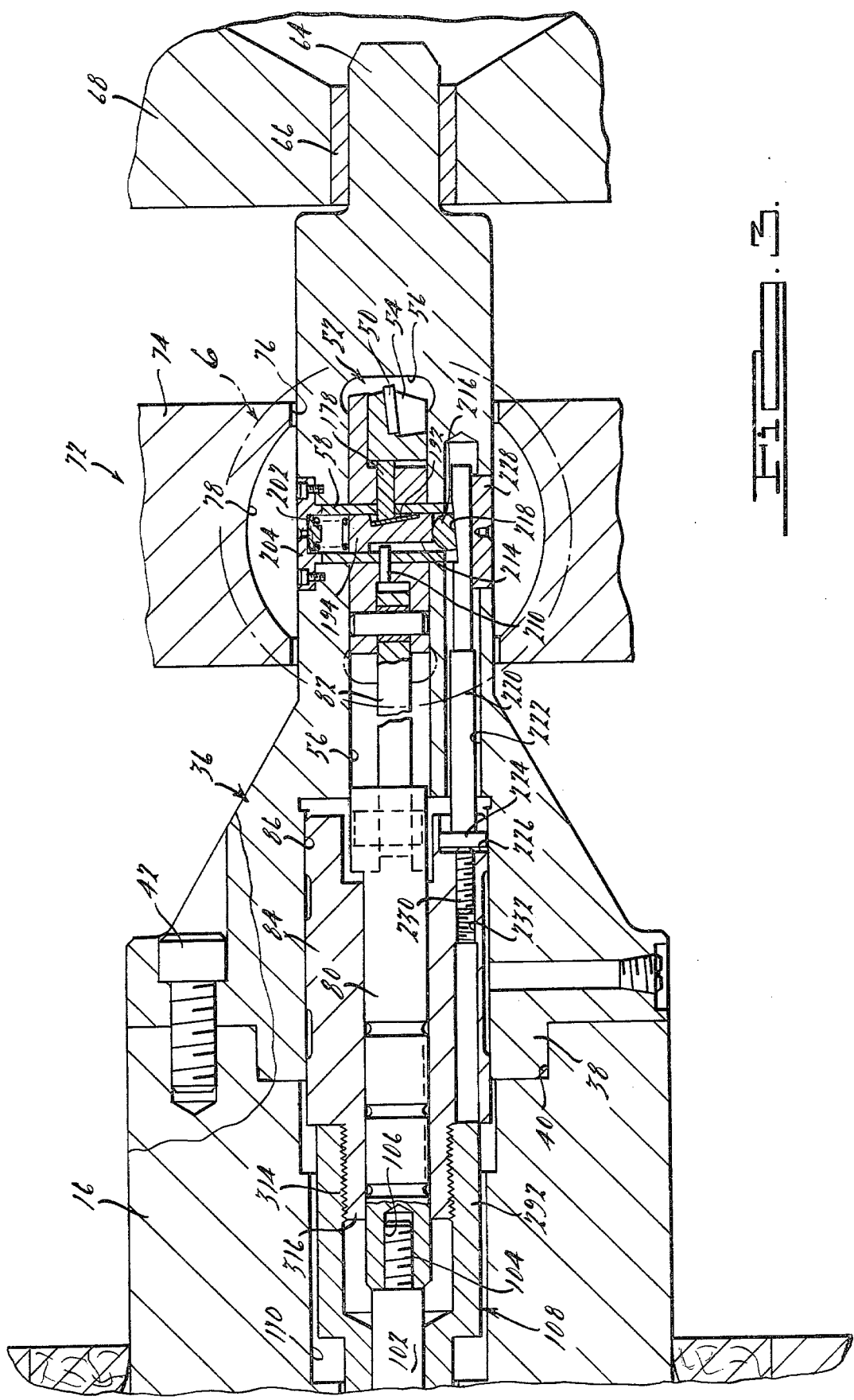
FIG. 3 is a longitudinal sectional view taken on the line 3—3 of FIG. 2.
Figure 6:
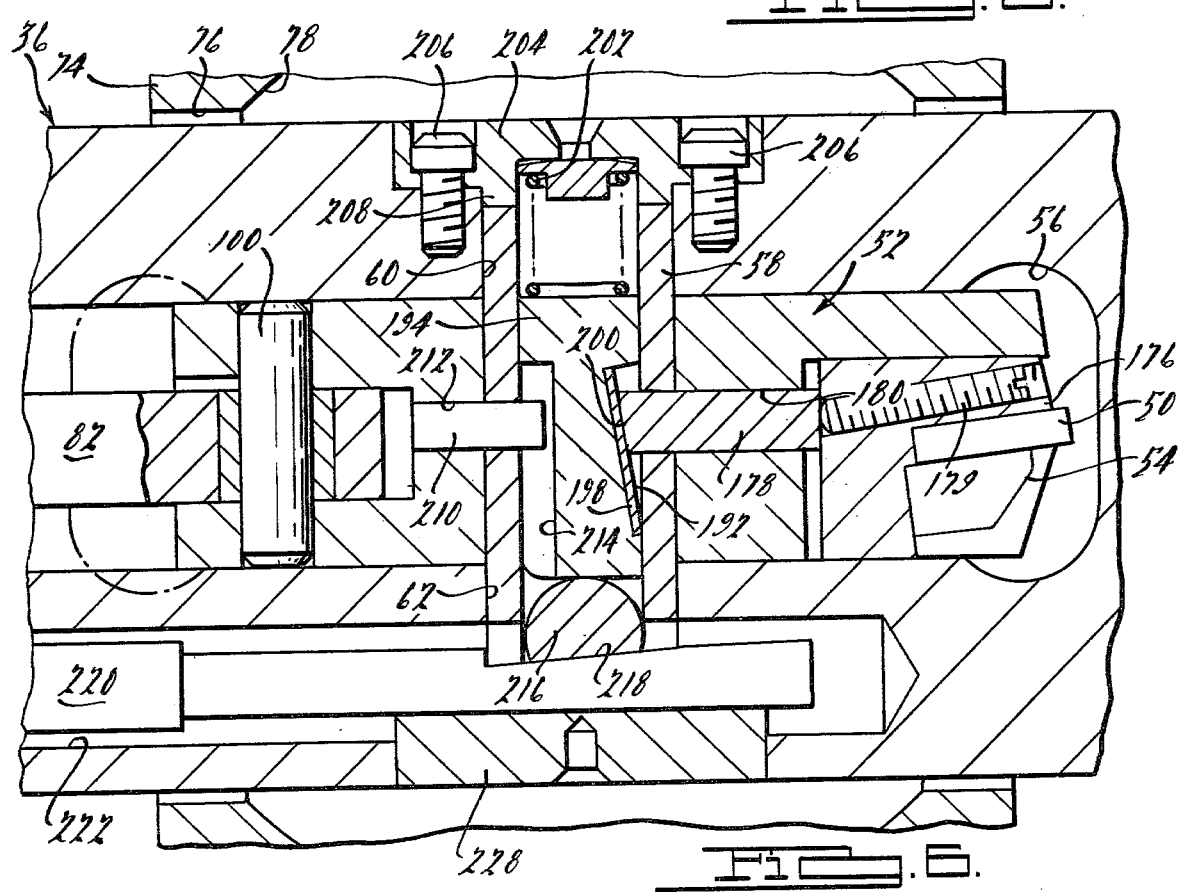
FIG. 6 is an enlarged view of the portion of FIG. 3 enclosed in the circle 6.

As shown in FIGS. 3 and 6, the plunger 194 terminates at both ends short of the sleeve bearing 58, and a spring 202 interposed between one end of the plunger and a plate 204, set into the boring bar 36 and fastened thereto by screws 206, urges the plunger in a direction to relieve pressure against the cutter carrying plate portion 176. An annular flange 208 formed on the plate 204 at the inner side thereof extends into the opening 60 and butts against one end of the sleeve bearing 58 to assure proper alignment of the portion of the bore 180 that extends through the bearing with the portion of the bore that extends through the plate 52. A pin-shaped key 210 in an opening 212 provided in the plate 52 at the back side of the sleeve bearing 58 extends into a longitudinal slot 214 in the plunger 194 and holds the plunger rotatably positioned in the bearing with the tapered cam surface 192 properly positioned with respect to the cam follower pin 178. The bore 212 conveniently extends at an angle from the slot 98 radially toward the turning axis of the plate 152 as perhaps best shown in FIG. 5.

The plunger 194 is moved upwardly, as shown in FIGS. 3 and 6, against the resilient action of the spring 202 by a ball actuator 216 in the end of the sleeve bearing 58 opposite the spring, and the actuator 216 in turn seats on a longitudinally tapered cam surface 218 formed in a sliding pin 220 which is mounted for reciprocable movement in a longitudinal bore 222 formed in the boring bar 36 at one side of the through slot 56. At its left hand end, as seen in FIG. 3, the pin 220 is formed with a head 224 that is received in a T-slot 226 in the sleeve 84. As previously stated, the sleeve 84 is freely slidable in the bore 86, and the pin 220 is constrained to move with the sleeve 84 through the head 224 and T-slot 226. The inner or right hand end of the pin 220, as viewed in FIGS. 3 and 6, is supported on a block 228 that is set into the side of the boring bar 36 and projects into the bore 222 a sufficient distance to hold the cam follower ball 216 snugly against the adjacent end of the plunger 194. A set screw 230 mounted in a threaded hole 232 provided in the sleeve 84 behind the T-slot 226 is tightened against the head 224 to eliminate all clearance between the head 224 and the T-slot 226 to assure solid back-up support for the various parts in the chain of actuator elements that move or flex the cutter carrying portion 176 of the plate 52 in all adjusted positions of the cutting element 50.

Power for reciprocally actuating the sleeve 84 in the bore 86 is provided by a drive motor 234 mounted on and fastened to a gear housing 240 at the rearward end thereof. The motor drive shaft 236 (FIG. 4) extends rearwardly into the chamber 238 of the gear housing 240 which is removably attached to the spindle housing 14. A removable cover 242 at the rear of the gear housing 240 is fastened to the latter by screws 244 and dowel pins 246. A drive gear 248 in the gear housing 240 is fixed to a stub shaft 250 by a key 252 and keyway 254, and the stub shaft is rotatably supported in the front wall of the housing 240 and in the cover 242 by bearings 256 and 258. The stub shaft 250 extends forwardly from the front wall of the housing 240 through a seal 260 and is rotatably connected to the motor drive shaft 236 by a coupling 262. A driven gear 264 in the housing 240 below and in mesh with the drive gear 248 has oppositely extending hub portions 266 and 268 journaled in bearings 270 and 272, respectively, that are received in and held snugly by recesses 274 and 276 in the cover 242 and in the front wall of the housing 240.

The driven gear 264 provides a reciprocable drive for slidably actuating the sleeve 84 by reasons of an internally threaded hole 278 in the gear 264 which engages external threads on a tubular nut 280 held against rotation by a pin 282 that extends through an axial opening 284 in the nut and has the opposite end portions thereof retained in openings 285 and 286 in the cover 242 and the front wall of the housing 240. The nut 280 is journaled for rotation on thrust bearings 288 and 290 which in turn are mounted on the pull tube 108. The outer races of the two thrust bearings 288 and 290 are separated by internal radial shoulders 289 and 291 in the nut 280 and the inner races thereof are separated by a spacer 294. A nut 298 on the pull tube 108 holds the rear bearing 288 against its shoulder 289 and acts through the spacer 294 to hold the front bearing solidly against a radial shoulder 296 on the pull tube 108.

As previously suggested, the intermediate pull rod section 102 is connected for mutual rotation with the boring bar 36. It also is rotatably supported in the gear housing 240 by a surrounding bearing 302 that is snugly received in a recess 304 provided in the gear housing cover 242 and held therein by a bearing retainer 306 fastened to the cover 242 by screws 308. As perhaps best shown in FIG. 4, the bearing retainer 306 also covers the hole 285 that receives one end of the pin 282 to retain the latter and to prevent inadvertent disengagement thereof from the nut 280. Seals 310 and 312 in the front wall of the gear housing 240 and in the bearing retainer 306 respectively prevent lubricant with which the gear housing 240 normally is at least partially filled from escaping along the intermediate pull rod section 102 or pull tube 108. At its forward end 292, the pull tube 108 is threadedly connected, as at 314, to a reduced diameter portion 316 of the sleeve 84.

In operation, workpieces 74, individually or mounted on fixturized pallets, are moved successively through the work station 72 in a conventional manner when the boring bar 36 is retracted by the slide 10. At this time, the boring bar 36 is completely retracted from the station 72 so as not to interfere with movement and handling of workpieces in the station. After a workpiece 74 has been moved into the station 72, it is suitably located and clamped in position to receive the boring bar 36, as shown in FIG. 3, when the latter is advanced into the station by the slide 10 as previously described. The boring bar 36 machines the internal spherical surface 78 of the workpiece 74 and is then retracted by the slide 10 to clear the work station preparatory to removal of the workpiece therefrom. The means for moving the workpiece into and out of the work station and for locating and clamping the same in the station for the machining operation are conventional and are not shown or described in this application.

In the normal operation of the machine, the boring bar 36 is continuously rotatably driven by the motor 24 in the manner hereinabove described so that production time is not lost in stopping rotation of the bar and bringing it up to speed again after each cycle of operation. The various functions performed by the machine during each operating cycle are regulated by a control circuit usually through timers and sequence switches so that, immediately after each workpiece is moved into and located and clamped in the work station 72, the slide 10 is advanced to project the boring bar 36 through the hole 76 in the workpiece and to journal the end portion of the bar in the supporting fixture 68. When the slide 10 comes up against a forward stop which limits further advancement thereof, the hydraulic cylinder 142 is operated to move the pull rod sections 80, 102 and 114 forwardly or to the right as viewed in the drawings. As the pull rod advances, the front section 84 thereof acts through the link 82 to turn the cutting tool holding plate 52 counterclockwise, as viewed in FIG. 2. As the plate 52 turns on the sleeve bearing 58, the cutting element 50 machines the internal spherical surface 78 of the workpiece 74. Immediately after completion of the machining operation on the spherical surface 78, the slide 10 is retracted to withdraw the boring bar from the opening 76 and to clear the work station 72 for movement of the workpiece 74 into the next station of the machine and simultaneous movement of a new workpiece into the station.

As suggested, it is contemplated that the machined surface 78 of each workpiece 74 be checked for dimension at a suitable point downstream of the work station 72 by means such as that disclosed in U.S. Pat. No. 3,914,678. When the monitoring means determines that the machined surface 78 is approaching the tolerance limit of its radius dimension either on the high side or on the low side, a signal is transmitted to the drive motor 234 that causes the latter to make a predetermined number of revolutions either clockwise or counterclockwise depending on whether the machined surface is approaching its maximum tolerance limit or its minimum tolerance limit. Control means for responding to a signal of the type described and for limiting the number of rotations of the drive motor 234 are well known and conventional in the art, as indicated in U.S. Pat. No. 3,914,678 previously identified, and therefore are not disclosed in this application which is concerned primarily with the mechanical means for adjusting the cutting element 50 to a proper radius dimension whenever the need for adjustment is indicated by the monitoring apparatus.

Figure 4:
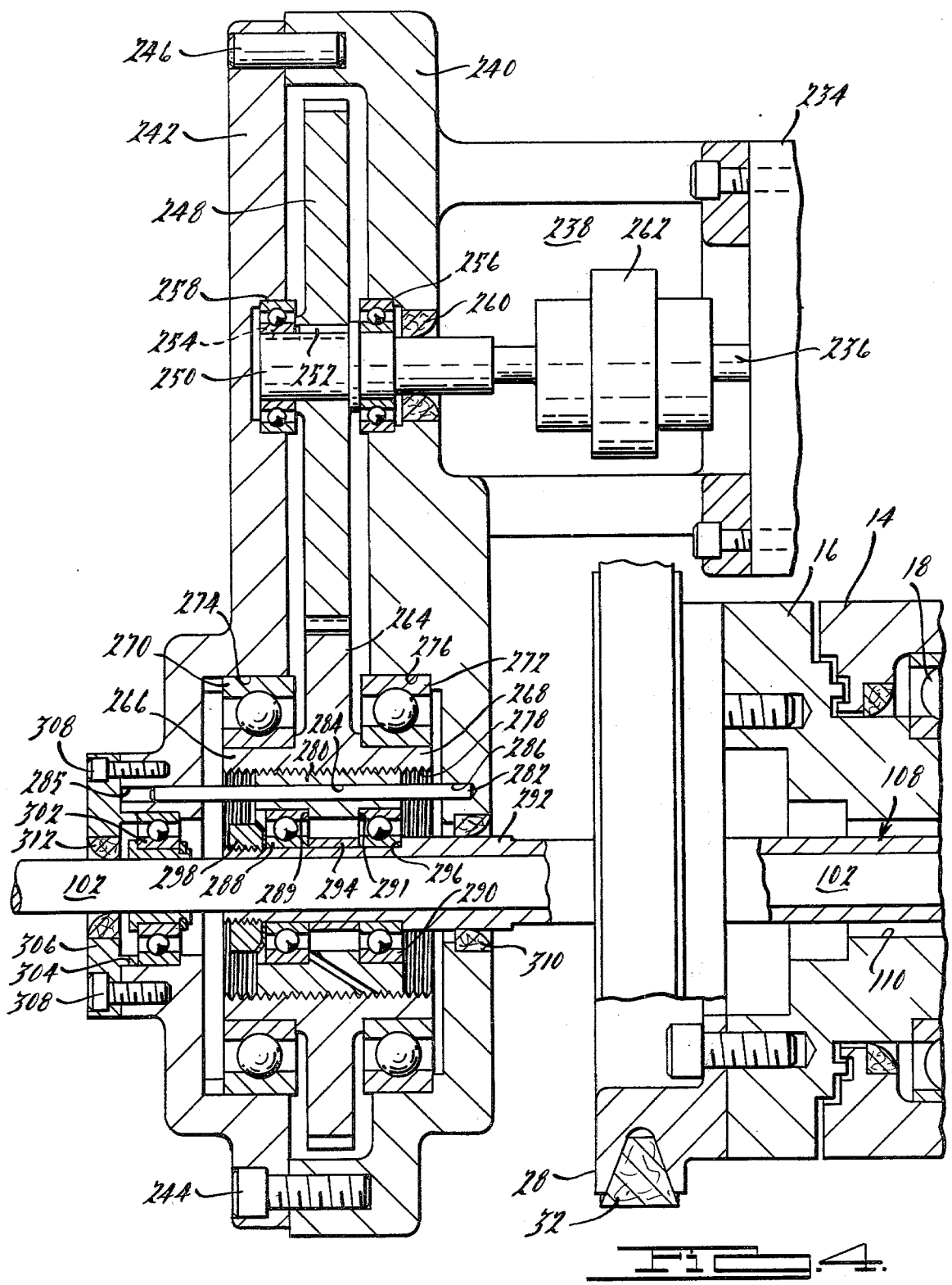
FIG. 4 is a fragmentary, vertical, longitudinal sectional view of the portion of FIG. 1 enclosed in the circle 4.

In any event, when the drive motor 234 is rotatably driven in a direction to increase the radius dimension of the cutting element 50, it acts through the gears 248 and 264 to move the nut 280 to the left, as viewed in FIG. 4, on the internal thread 278 of the driven gear 264. The latter acts as a feed screw to move the nut 280 to the left, and the nut acts through the thrust bearings 288 and 290 to impart a corresponding movement to the pull tube 108. Movement of the pull tube 108 in this manner imparts a corresponding movement to the sleeve 84 through the threaded connection 314, and the sleeve 84 in turn pulls back on the sliding pin 220 to move the tapered cam face 218 against the cam follower ball 216. The latter in turn moves the plunger 194 upwardly, as viewed in FIG. 3, against the resilient action of the spring 202 so that the cam face 192 in turn acts against the pin 178 to the right, as viewed in FIG. 3. This action projects the pin 178 against the cutter carrying plate portion 176 and flexes it radially outwardly to increase the cutting radius of the element 50. The amount the cutting radius is increased, of course, depends on the number of rotations the drive motor 234 is caused to make and the pitch of the feed screw 278. In a typical situation, these facts are worked out to move the cutting tool 50 by approximately 0.0001 inches each time the drive motor 234 is energized. Typically, too, the maximum total compensation contemplated or permitted for the cutting tool 50 before it is replaced by a new or sharpened tool is approximately 0.005 inches.

Conversely, if the drive motor 234 is rotatably driven in the opposite direction, the radial dimension of the cutting element 50 with respect to the rotational axis of the boring bar 36 will be descreased by reverse movement of the actuating parts interconnecting the drive motor and the cutter carrying plate portion 176. More particularly, the motor 234 acts through the gears 248 and 264 to move the nut 280 to the right, as viewed in FIG. 4. As the nut 280 moves in this manner, it acts through the thrust bearings 288 and 290 to shift the pull tube 108 to the right, and the pull tube imparts a corresponding movement to the sleeve 84 which then acts through the sliding pin 220 to move the cam face 218 away from the cam follower ball actuator 216. As pressure from the cam face 218 against the ball actuator 216 is relieved, the latter moves down in the sleeve bearing 58 and the helical spring 202 imparts a corresponding movement to the plunger 194. As the plunger 194 moves downwardly in the sleeve bearing 58, the cam face 192 moves away from the pin 178 and, as pressure against the latter is relieved, the pin 178 moves to the left, as viewed in FIG. 3. This movement of the pin 178, in turn, relieves pressure against the cutting element 50 carrying plate portion 176 and permits the resilient neck portion 174 to move the cutting element radially inwardly so as to reduce the cutting radius of the latter an appropriate amount.

It will thus be seen that the primary objective of the present invention has been achieved by the means hereinabove described. The cutting radius of a boring bar adapted to machine an internal spherical surface can be selectively increased or decreased in accordance with the job requirements. Further, the adjustment can be made while the boring bar is being rotatably driven by means that does not interfere with or in any way impede normal operation of the mechanism that turns the cutting element holding plate to make the cut. It is a particular feature of the invention that the adjustment can be made not only while the boring bar is being rotatably driven but also that this can be done without in any way otherwise affecting the normal operating cycle of the machine. At the same time, the mechanical means for making the adjustment in the radius dimension of the cutting element provides solid support for the latter in all adjusted positions thereof, whether radially inwardly or radially outwardly. As a consequence, there is no undesirable chatter or other adverse effects during the machining operation attributable to the means through which the adjustment of the cutting element in either direction is made.

We claim:
1. In a machine tool,
a rotatably driven member;
a holder carried by and rotatable with said member and oscillatively actuatable about an axis substantially perpendicular to the rotational axis of said member;
a cutting element carried by said holder; resilient means associated with said holder permitting movement of said cutting element radially relative to the oscillatory axis of said holder normally yieldably urging said cutting element in the direction of said oscillatory axis;
first actuator means mounted for rotation with said driven member and for reciprocatory movement relative thereto operatively connected to said holder to rock the latter about said oscillatory axis; and
second actuator means also mounted for rotation with said driven member and for reciprocatory movement relative thereto independently of said first actuator means coactive with said resilient means for adjusting said cutting element radially away from the oscillatory axis of said holder against the action of said resilient means.

2. A machine tool as defined by claim 1 wherein said second actuator means comprises a plurality of separate parts, and cam and cam follower means cooperatively associated with at least certain of said separate parts to transmit reciprocatory movement of said second actuator means from one part to the other and operative to solidly support the same in all adjusted positions thereof.

3. The combination as set forth in claim 1 wherein
said holder has relatively movable parts one of which carries said cutting element; wherein said resilient means interconnects said relatively movable parts; and wherein
said second actuator means includes coactive cam and cam follower means,
said cam means being movable in one direction to adjust said cutting element radially outwardly against the action of said resilient means and movable in the opposite direction to permit said resilient means to move said cutting element radially inwardly, and
said cam means further providing solid support for said cutting element through said cam follower means in all adjusted positions of said cutting element.

4. The combination as set forth in claim 3 wherein
said resilient means is integral with the part of said holder that carries said cutting element and is flexible in use to yieldingly resist movement of said cam means in said one direction and by its resilient action serves to move said cutting element radially inwardly upon movement of said cam means in said opposite direction.

5. The combination as set forth in claim 1 wherein
said holder has relatively movable parts one of which carries said cutting element, wherein
said resilient means interconnects said parts whereby to yieldingly resist radial outward adjustment of said cutting element and by its resilient action is operative to adjust said cutting element radially inwardly; and wherein
said second actuator means includes a reciprocable actuator member movable parallel to the rotational axis of such driven member;
first cam and cam follower means,
said cam means being coactive with said reciprocable actuator member and movable parallel to the rotational axis of said driven member, and
said cam follower means being reciprocally actuatable by said cam means in a direction perpendicular to said rotational axis;
second cam and cam follower means,
said second cam means being coactive with said first cam follower means, and
said second cam follower means being movable by said second cam means in a direction parallel to said rotational axis and cooperative with said one part of said holder to move said cutting element radially with respect to said rotational axis.

6. In a boring machine of the type having a rotatable spindle mounted on a slide, a boring bar attached to said spindle at one end thereof and rotatable therewith, and means for rotatably driving said spindle and said boring bar, the improvement comprising
a holder;
means mounting said holder on the boring bar for oscillation about an axis extending transversely to the rotational axis of said boring bar;
a cutting element carried by said holder and adjustable radially with respect to the oscillatory axis thereof, said cutting element being movable by oscillation of the holder to swing a cutting edge thereof in an arcuate path and against a workpiece in said machine;
actuator means for said holder and said cutting element, said actuator means including
inner and outer actuator members mounted for independent reciprocation in the spindle and coaxially with respect to each other and to said spindle,
means interconnecting the inner actuator member and the holder for translating reciprocatory motion of said actuator member into oscillatory motion of said holder, and
means actuated by said outer actuator member for radially adjusting said cutting element and for solidly supporting the same in all adjusted positions thereof.

7. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, and the means for pivotally actuating said cutting tool holding plate and said adjusting means having separate actuator elements mounted in said spindle coaxially with respect to the latter and to each other, both of said actuator elements being rotatable with said spindle and independently axially slidably movable relative to said spindle and to each other.

8. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotatational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, and the means for pivotally actuating said cutting tool holding plate and said adjusting means having separate inner and outer actuator elements, respectively, said actuator elements being mounted in said spindle coaxially with respect thereto and to each other and adapted for rotation with said spindle and independent axial sliding movement relative to said spindle and to each other and including separate drive means for independently reciprocally actuating said inner and outer actuator elements.

9. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, and the means for pivotally actuating said cutting tool holding plate and said adjusting means having separate inner and outer actuator elements, respectively, said actuator elements being mounted in said spindle coaxially with respect thereto and to each other and adapted for rotation with said spindle and independent axial sliding movement relative to said spindle and to each other and including drive means for reciprocally actuating said inner actuator element, and separate drive means including a rotatably driven feed screw and a nut coactive therewith, said nut being linearly movable by rotation of said feed screw and operatively connected to said outer actuator element to slidably actuate the same longitudinally on said inner actuator element and in said spindle.

10. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, first actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, and second actuator means extending axially through said spindle and said boring bar and operable from the rear of said spindle, said first actuator means including a reciprocable draw bar in and rotatable with said spindle, and said second actuator means including a draw sleeve mounted in said spindle concentrically with respect to said draw bar, said draw sleeve being rotatable with said spindle and slidably actuatable independently of said draw bar.

11. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, a cutting element carried by and pivotally movable with said plate, said plate having separate relatively movable portions interconnected by flexible and resilient means normally holding said portions in mutually spaced relation and adapted to permit one of said portions to move relative to the other generally radially with respect to the pivot axis of said plate and the rotational axis of said boring bar, said one plate portion carrying said cutting element and the other of said plate portions being connected to said boring bar by said pivot means, actuator means connected to said plate and operative to oscillate the latter about said pivot axis, and adjusting means for moving said cutting element between predetermined limits radially of the pivot axis of said plate and the rotational axis of said boring bar during rotation of the latter, said adjusting means including cam and cam follower means in said other plate portion, said cam follower means being engageable with said one plate portion and slidably movable relative thereto, said cam means seating said cam follower means to solidly support said cutting element in all radially adjusted positions thereof and being movable to slidably actuate said cam follower means to or from said one plate portion, said cam means comprising a spring biased plunger mounted on and movable along the pivot axis of said plate.

12. The combination as set forth in claim 11 including
   a sleeve bearing carrying and pivotally supporting said other plate portion in said boring bar, wherein
   said cam plunger is mounted for axial sliding movement in said sleeve bearing, and wherein
   said cam follower means extends radially through said sleeve bearing to seatingly engage said cam means.

13. The combination as set forth in claim 7 wherein
   said adjusting means includes first cam and cam follower means actuatable to move said cutting element; and
   second cam and cam follower means operatively connected to and actuatable by one of said actuator elements for translating motion from the latter to said first cam and cam follower means.

14. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, said cutting tool holding plate having separate relatively movable portions interconnected by flexible and resilient means normally holding said portions in mutually spaced relation and adapted to permit one of said portions to move relative to the other generally radially with respect to the pivot axis of said plate and the rotational axis of said boring bar, said one plate portion carrying said cutting element and the other of said plate portions being connected to said boring bar by said pivot means; the means for pivotally actuating said cutting tool holding plate and said adjusting means having separate actuator elements mounted in said spindle coaxially with respect to the latter and to each other, both of said actuator elements being rotatable with said spindle and independently axially slidably movable relative to said spindle and to each other; and said adjusting means further including first cam and cam follower means actuatable to move said one plate portion whereby to adjust said cutting element radially with respect to the pivotal axis of said plate and the rotational axis of said boring bar, and second cam and cam follower means operably connected to and actuatable by one of said actuator elements for translating motion from the latter to said first cam and cam follower means.

15. The combination as set forth in claim 14 wherein said first cam and cam follower means are mounted in and carried by said other portion of said plate, said first cam follower means being movable along the rotational axis of said boring bar to move said one portion of said plate and to adjust said cutting element, said first cam means being movable along the pivotal axis of said plate to actuate said first cam follower means.

16. The combination as set forth in claim 15 wherein said second cam and cam follower means are mounted in said boring bar laterally of said plate and said first cam and cam follower means, said second cam and cam follower means being coactive with said first cam means to move the latter along the pivot axis of said plate, and said second cam means being operable by one of said actuator elements to actuate said second cam follower means and said first cam means.

17. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, said cutting tool holding plate having separate relatively movable portions interconnected by flexible and resilient means normally holding said portions in mutually spaced relation and adapted to permit one of said portions to move relative to the other generally radially with respect to the pivot axis of said plate and the rotational axis of said boring bar, said one plate portion carrying said cutting element and the other of said plate portion being connected to said boring bar by said pivot means; the means for pivotally actuating said cutting tool holding plate and said adjusting means having separate inner and outer actuator elements, respectively, mounted in said spindle coaxially with respect to the latter and to each other, and separate drive means for said actuator elements, both of said actuator elements being rotatable with said spindle and independently axially slidably movable relative to said spindle and to each other, the drive means for said outer actuator element including a rotatably driven feed screw and a nut coactive therewith operatively connected to said outer actuator element to reciprocally actuate the same; and said adjusting means further including first cam and cam follower means actuatable to move said one plate portion whereby to adjust said cutting element radially with respect to the pivotal axis of said plate and the rotational axis of said boring bar, and second cam and cam follower means operably connected to and actuatable by said outer actuator element for translating motion from the latter to said first cam and cam follower means.

18. In a boring machine of the type having a rotatable drive spindle carrying and rotatably driving a boring bar and means for rotatably driving said spindle and said boring bar, the combination of a cutting tool holding plate in said boring bar, pivot means mounting said plate for pivotal or rocking movement about an axis substantially perpendicular to the rotational axis of said boring bar, actuator means connected to said plate and operative to oscillate the latter about said pivot axis, a cutting element carried by and pivotally movable with said plate, and adjusting means for moving said cutting element between predetermined limits radially of the pivot axis of said plate and the rotational axis of said boring bar during rotation of the latter, said adjusting means including means for solidly supporting said cutting element in all radially adjusted positions thereof, said cutting tool holding plate having separate relatively movable portions interconnected by flexible and resilient means normally holding said portions in mutually spaced relation and adapted to permit one of said portions to move relative to the other generally radially with respect to the pivot axis of said plate and to the rotational axis of said boring bar, said one plate portion carrying said cutting element and the other of said plate portions being connected to said boring bar by said pivot means; the means for pivotally actuating said cutting tool holding plate and said adjusting means having separate inner and outer actuator elements, respectively, mounted in said spindle coaxially with respect thereto and to each other, both of said actuator elements being rotatable with said spindle and independently axially slidably movable in said spindle and relative to each other, a power cylinder drivingly connected to said inner actuator element to slidably actuate the same longitudinally in said spindle, and an electric motor drivingly connected to said outer actuator element through feed screw and nut means to slidably actuate the same longitudinally in said spindle and on said inner actuator element; and said adjusting means including first cam and cam follower means actuatable to move said one plate portion whereby to adjust said cutting element radially with respect to the pivotal axis of said plate and to the rotational axis of said boring bar, said second cam and cam follower means cooperable with said outer actuator element and said first cam and cam follower means for transferring motion from said outer actuator element to said one plate portion through said first cam and cam follower means.

19. A machine tool as defined by claim 2 wherein said resilient means is operative to hold said cam and cam follower means in mutually pressed engagement, and including
adjustable means coactive with said resilient means to hold said cam and cam follower means in mutually pressed engagement and further operative to take up slack or lost motion between said separate parts.

20. In a machine tool of the type having a rotatably driven spindle and a boring bar carried by and rotatable with said spindle, the improvement comprising
a pivot carried by and extending diametrically of said boring bar;
a cutter holder journaled for rotational movement on said pivot and having a flexible cutter-carrying portion adapted to be flexed to adjust the cutter carried thereby radially with respect to said pivot;

first and second actuator means mounted in said spindle and said boring bar for mutual rotation therewith and for independent reciprocatory movement;

means interconnecting said first actuator means and said cutter holder for translating reciprocatory movement of said first actuator means into rotational movement of said cutter holer on said pivot;

means interrelated with said second actuator means and the flexible portion of said cutter holder acting through said pivot for translating reciprocatory movement of said second actuator means into flexing movement of the mentioned portion of said cutter holder to move the cutter relative to the axis of said pivot; and drive means for independently reciprocally actuating said first and second actuator means.

* * * * *